United States Patent Office 3,661,911
Patented May 9, 1972

3,661,911
MONO, DI, AND TRI PYRIDINE COMPLEXES OF ORGANOTIN COMPOUNDS
Holger Meyer, Bromma, Sweden, assignor to Monsanto Company, St. Louis, Mo.
No Drawing. Filed Nov. 21, 1966, Ser. No. 595,599
Claims priority, application Sweden, Nov. 23, 1965, 15,124/65
Int. Cl. C07d 31/26
U.S. Cl. 260—270 R
2 Claims

ABSTRACT OF THE DISCLOSURE

The compounds are of the class of organotin complexed with one to three moles of pyridine, useful as pesticides. This class is exemplified by the dipyridine complex of bis-(dibromocyclohexyl)-diphenyltin.

This invention relates to organotin compounds having the formula

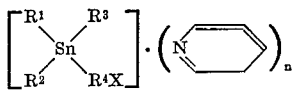

wherein $R^1$ is phenyl; $R^2$ and $R^3$ each are alkyl having from 1 to 5 carbon atoms, phenyl, cyclohexyl, halogen, halo-substituted alkyl having from 1 to 5 carbon atoms or halo-substituted cyclohexyl; $R^4$ is halo-substituted cyclohexyl or halo-substituted alkyl having from 2 to 5 carbon atoms, X is halogen and $n$ is an integer from 1 to 3.

The novel compounds display activity for combatting insects, fungi, weeds and microorganisms such as bacteria and viruses.

The compounds of this invention are readily prepared according to the following equation:

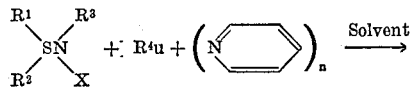

and

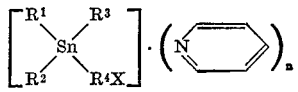

where $R^1$, $R^2$, $R^3$, $R^4$, X and $n$ are as above described and where $R^4u$ is an unsaturated $R^4$ moiety. It is preferred that a suitable solvent be provided for the reaction which can be a non-reactive solvent or an excess of pyridine. Ethanol is the preferred non-reactive solvent.

The reaction mass heated for a period of time and cooled. When the reaction medium or solvent selected is an excess of pyridine, a suitable solvent such as ethanol, ether, n-pentane, etc., is added to the cooled reaction mass and the reaction mass (with any added solvent) is further cooled to —20° C., and kept there for a few hours. The crude product is filtered from the cold reaction mass and purified by recrystallization.

The invention will be more clearly understood from the following detailed description of specific examples thereof;

EXAMPLE 1

Diphenyltin dibromide 2.0 g. (4.62 mmoles) is suspended in 7 g. of pyridine. 3-bromocyclohexene (0.75 g., 4.62 mmoles) in 3 g. of pyridine is added and the mixture heated for 90 minutes at 50° C. on a water-bath. After cooling, 25 ml. of ether is added, and the flask is kept at —20° overnight. The crude product is filtered off, washed with 25 ml. of ether and recrystallized twice from 20 and 15 ml. of ethanol. Yield: 2.2 g. (57.3%) of the tripyridine complex of dibromocyclohexyldiphenyltin bromide. Melting point 128–131°. Salmon red crystals.
$C_{33}H_{34}Br_3N_3Sn=831.07$. Calc. (percent): C, 47.69; H, 4.12; Br, 28.85. Found (percent): C, 45.77; H, 4.28; Br, 28.62.

EXAMPLE 2

Diphenyltin dibromide (2.0 g., 4.62 mmoles) is suspended in 7 g. of pyridine, and 3-bromocyclohexene (1.49 g., 9.24 mmoles) dissolved in 3 g. of pyridine was added. The reaction mixture is warmed on a water-bath at 50° for 90 minutes. The color rapidly turns to dark violet. The mixture is cooled, and 20 ml. of ether is added. The reaction mass is stored at —20° for 2 hours. The crude product is filtered off, washed with 30 ml. of ether, and recrystallized from 45 ml. of ethanol after treatment of the solution with charcoal. Yield: 2.3 g. (75.8%) of the dipyridine complex of bis-(dibromocyclohexyl)-diphenyltin. Melting point 166°. Pale red crystals.
$C_{34}H_{38}Br_4N_2Sn=913.02$. Calc. (percent): C, 44.72; H, 4.20; Br, 35.01. Found (percent): C, 45.15; H, 4.13; Br, 34.74.

EXAMPLE 3

Diphenyltin dibromide (2.0 g., 4.62 mmoles) is suspended in 15 ml. of ethanol, and allyl bromide (0.56 g., 4.62 mmoles) and pyridine (0.37 g., 4.62 mmoles) in 5 ml. of ethanol is added. On boiling, a colorless solution is obtained and the solution is maintained at reflux for 3 hours. The solution is cooled slowly and kept overnight at —20°. A snow-white substance is filtered off and recrystallized from 12 ml. of ethanol. Yield: 1.3 g. (44.5%) of the pyridine complex of dibromopropyldiphenyltin bromide which melts to a viscous oil and decomposes at 152–159°.
$C_{20}H_{20}Br_3NSn=632.81$. Calc. (percent): Br, 37.89. Found (percent): Br, 36.84.

EXAMPLE 4

Diphenyltin dibromide (2.0 g., 4.62 mmoles) is suspended in 10 g. of pyridine, and allyl bromide (0.56 g., 4.62 mmoles) is added. The mixture is heated for 90 minutes at 50° on a water-bath. The reaction mass is cooled and diluted with 25 ml. of ether. The reaction mass is then stored at —20° for several hours. The crude product is filtered off, washed with 50 ml. of ether and recrystallized three times from 25–15 ml. of ethanol. Yield: 1.4 g. (42.6%) of the dipyridine complex of dibromopropyldiphenyltin bromide. Melting point 128–131°. Pale yellow crystals.
$C_{25}H_{25}Br_3N_2Sn=711.91$. Calc. (percent): C, 42.18; H, 3.54; Br, 33.68. Found (percent): C, 42.52; H, 3.75; Br, 33.16.

EXAMPLE 5

Diphenyltin dibromide (2.0 g., 4.62 mmoles) is dissolved in 20 ml. of ethanol, and allyl bromide (1.12 g., 9.24 mmoles) and pyridine (0.73 g., 9.24 mmoles) in 5 ml. of ethanol is added. The mixture is boiled at reflux for 3 hours and then kept at —20° overnight. The crude product is filtered off, washed with 30 ml. of ether, and recrystallized from 18 ml. of ethanol. Yield: 2.6 g. (67.5%) of the dipyridine complex of bis-(dibromopropyl)-diphenyltin. Melting point 166–167°.
$C_{28}H_{30}Br_4N_2Sn=832.9$. Calc. (percent): C, 40.37; H, 3.63; Br, 38.38. Found (percent): C, 41.67; H, 3.80; Br, 38.00.

EXAMPLE 6

2.0 g. of the dipyridine complex of dibromopropyldiphenyltin bromide (2.80 mmoles) and 0.45 g. of 3-bromocyclohexene (2.80 mmoles) suspended in 9 g. of pyridine is heated on a water-bath at 50° for 2 hours. The reaction mass is cooled and 45 ml. of ether is added. The reaction mass is kept at −20° for 2 hours. The crude product is filtered off, washed with 45 ml. of ether and recrystallized from 12 ml. of ethanol. Yield: 1.9 g. (78.1%) of the dipyridine complex of dibromopropyl-dibromocyclohexyldiphenyltin. Melting point 147–149°. Brownish crystals.

$C_{31}H_{34}Br_4N_2Sn$=872.96. Calc. (percent): C, 42.65; H, 3.93; Br, 36.63. Found (percent): C, 43.56; H, 4.03; Br, 35.95.

EXAMPLE 7

(a) Triphenyltin bromide (2.0 g., 4.65 mmoles) is dissolved in 10 g. of pyridine, allyl bromide (0.56 g., 4.65 mmoles) is added, and the solution shaken for a short period at 20°. The solution, which immediately turned yellow, is heated for 2 hours at 50° on a water-bath. After cooling, 25 ml. of n-pentane is added and the reaction mass is cooled and maintained at −20° for a few hours. 2.8 g. of crude product is filtered off, washed with 25 ml. of n-pentane and recrystallized from 12 ml. of ethanol after treatment of the ethanol solution with charcoal. Yield: 1.65 g. (56.1%) of the pyridine complex of dibromopropyl-triphenyltin. Melting point 129–130°.

(b) A mixture of triphenyltin bromide (2.0 g., 4.65 mmoles) pyridine (0.37 g., 4.65 mmoles) and allylbromide (0.56 g., 4.65 mmoles) in 8 ml. of ethanol is boiled with reflux for 3 hours. The solution is cooled slowly and stored at −20° overnight. 2.45 g. of crude product were filtered off and recrystallized from 12 ml. of ethanol after treatment of the ethanol solution with charcoal. Yield: 1.4 g. (47.8%) of the pyridine complex of dibromopropyltriphenyltin. Melting point 129–130°. White crystals.

$C_{26}H_{25}Br_2NSn$=630.0. Calc. (percent): C, 49.57; H, 4.00; Br, 25.37. Found (percent): C, 49.49; H, 4.27; Br, 25.27.

EXAMPLE 8

Triphenyltin bromide (2.0 g., 4.65 mmoles) is dissolved in 5 g. of pyridine, and 3-bromocyclohexene (0.75 g., 4.65 mmoles) is added. The solution is heated on a water-bath at 50° for 90 minutes, and the color turned to wine-red after a few minutes. The reaction mixture is cooled, and 25 ml. of ether is added. After being kept at −20° for 2 hours the crude product is filtered off, washed with 25 ml. of ether and recrystallized from 20 ml. of ethanol after treatment of the ethanol solution with charcoal. Yield: 1.8 g. (57.7%) of the pyridine complex of dibromocyclohexyltriphenyltin. Melting point 131–132°. White crystals.

$C_{29}H_{29}Br_2NSn$=670.06. Calc. (percent): C, 51.98; H, 4.36; Br, 23.85. Found (percent): C, 52.51; H, 4.49; Br, 23.41.

To illustrate the pesticidal and phytotoxic effectiveness of the compounds of this invention, the following examples are representative:

EXAMPLE 9

Six (6) parts per million of the dipyridine complex of bis-(dibromocyclohexyl)-diphenyltin completely inhibits the growth of *Venturia inaequalis*.

EXAMPLE 10

Dipyridine complex of dibromopropyl-triphenyltin

An LD100 against midge larvae utilizing two (2) parts per million;

A LD100 against young snakes utilizing one (1) part per million; and

A 0.2% solution by weight sprayed on two-week old wild oat plants provides a complete kill.

Although this invention is described with respect to specific examples, the details thereof are not to be construed as limitations except as indicated by the appended claims.

What is claimed is:

1. A pyridine complex of an organotin compound selected from the group consisting of the tripyridine complex of dibromocyclohexyldiphenyltin bromide, the dipyridine complex of bis-(dibromocyclohexyl)-diphenyltin, the pyridine complex of dibromopropyldiphenyltin bromide, the dipyridine complex of dibromopropyldiphenyltin bromide, the dipyridine complex of bis-(dibromopropyl)-diphenyltin, the dipyridine complex of dibromopropyl-dibromocyclohexyldiphenyltin the pyridine complex of dibromocyclohexyltriphenyltin and the pyridine complex of dibromopropyl triphenyltin.

2. A compound according to claim 1 which is the dipyridine complex of bis - (dibromocyclohexyl)-diphenyltin.

References Cited

UNITED STATES PATENTS

| | | | |
|---|---|---|---|
| 2,867,566 | 1/1959 | Weinberg | 260—270 X |
| 3,047,579 | 7/1962 | Witman | 260—289 |
| 3,284,296 | 11/1966 | Freiberg | 260—289 |
| 3,310,562 | 3/1967 | Blanchard | 260—270 |
| 3,321,481 | 5/1967 | Schroder | 260—270 |
| 3,344,019 | 9/1967 | Sowa | 424—245 X |

DONALD G. DAUS, Primary Examiner

U.S. Cl. X.R.

71—94; 260—429.7; 425—245